United States Patent
Cui

(10) Patent No.: US 11,829,580 B2
(45) Date of Patent: Nov. 28, 2023

(54) MULTI-PIECE TEXT COPY METHOD AND MOBILE TERMINAL

(71) Applicant: VIVO MOBILE COMMUNICATION CO., LTD., Guangdong (CN)

(72) Inventor: Xiaodong Cui, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 227 days.

(21) Appl. No.: 16/956,506

(22) PCT Filed: Dec. 18, 2018

(86) PCT No.: PCT/CN2018/121745
§ 371 (c)(1),
(2) Date: Jun. 19, 2020

(87) PCT Pub. No.: WO2019/120191
PCT Pub. Date: Jun. 27, 2019

(65) Prior Publication Data
US 2021/0011590 A1    Jan. 14, 2021

(30) Foreign Application Priority Data
Dec. 21, 2017    (CN) .......................... 201711395063.1

(51) Int. Cl.
*G06F 3/04842* (2022.01)
*G06F 3/0483* (2013.01)
(Continued)

(52) U.S. Cl.
CPC ........ *G06F 3/0483* (2013.01); *G06F 3/04842* (2013.01); *G06F 3/04883* (2013.01); *G06F 40/166* (2020.01)

(58) Field of Classification Search
CPC .... G06F 3/048; G06F 3/04817; G06F 3/0483; G06F 3/0484; G06F 3/04842;
(Continued)

(56) References Cited

U.S. PATENT DOCUMENTS 5,461,710 A * 10/1995 Bloomfield ........... G06F 3/0483
715/839
6,240,430 B1 * 5/2001 Deike .................... G06F 40/166
715/250
(Continued)

FOREIGN PATENT DOCUMENTS

| CN | 103034411 A | 4/2013 |
|---|---|---|
| CN | 103761216 A | 4/2014 |

(Continued)

OTHER PUBLICATIONS

EP Search Report in Application No. 18890322.3 dated Mar. 24, 2021.
(Continued)

*Primary Examiner* — Kavita Stanley
*Assistant Examiner* — William Wong
(74) *Attorney, Agent, or Firm* — Maschoff Brennan

(57) ABSTRACT

The present disclosure provides a multi-piece text copy method and a mobile terminal. The multi-piece text copy method includes: receiving N inputs from a user; displaying N text editing controls in response to the N inputs respectively; acquiring N pieces of target text selected by the N text editing controls respectively; receiving a first input from the user at a target position in first text information; and copying the N pieces of target text to the target position in response to the first input. Each text editing control includes a text selection identifier and a control addition identifier, N is an integer greater than 1, and any two of the N pieces of target text are not adjacent to each other.

20 Claims, 7 Drawing Sheets

(51) Int. Cl.
*G06F 40/166* (2020.01)
*G06F 3/04883* (2022.01)

(58) Field of Classification Search
CPC .. G06F 3/04883; G06F 3/0486; G06F 3/0488; G06F 3/0489; G06F 40/166
See application file for complete search history.

(56) References Cited

U.S. PATENT DOCUMENTS

| | | | |
|---|---|---|---|
| 10,534,502 B1* | 1/2020 | Boyers | G06F 3/04817 |
| 2010/0122160 A1 | 5/2010 | Chirakansakcharoen et al. | |
| 2010/0235726 A1* | 9/2010 | Ording | G06F 3/0488 715/810 |
| 2011/0231796 A1* | 9/2011 | Vigil | G06F 3/04883 715/810 |
| 2012/0229397 A1* | 9/2012 | Cho | G06F 3/04842 345/173 |
| 2012/0306772 A1* | 12/2012 | Tan | G06F 3/0488 345/173 |
| 2013/0067373 A1* | 3/2013 | Weir | G06F 3/033 715/810 |
| 2014/0109019 A1* | 4/2014 | Rana | G06F 3/04842 715/863 |
| 2014/0143664 A1* | 5/2014 | Tsang | G06F 9/543 715/256 |
| 2014/0372952 A1* | 12/2014 | Otero | G06F 40/18 715/835 |
| 2015/0046799 A1 | 2/2015 | Isidore | |
| 2015/0169502 A1* | 6/2015 | Koenig | G06F 3/04842 715/256 |
| 2015/0186350 A1 | 7/2015 | Hicks | |
| 2016/0077717 A1* | 3/2016 | Hur | G06F 3/04845 715/769 |
| 2016/0274686 A1* | 9/2016 | Alonso Ruiz | G06F 3/04845 |
| 2016/0292139 A1* | 10/2016 | Hui | G06F 40/166 |
| 2018/0329622 A1* | 11/2018 | Missig | G06F 3/04886 |

FOREIGN PATENT DOCUMENTS

| | | |
|---|---|---|
| CN | 104375980 A | 2/2015 |
| CN | 106168905 A | 11/2016 |
| CN | 106527884 A | 3/2017 |
| CN | 106648915 A | 5/2017 |
| CN | 106681588 A | 5/2017 |
| CN | 106919307 A | 7/2017 |
| CN | 107247698 A | 10/2017 |
| CN | 107967093 A | 4/2018 |

OTHER PUBLICATIONS

CN Office Action in Application No. 201711395063.1 dated Sep. 29, 2019, 14 pages.
CN Search Report in Application No. 201711395063.1 dated Nov. 16, 2018, 12 pages.
Written Opinion in International Search Report in Application No. PCT/CN2018/121745 dated Jul. 2, 2020, 16 pages.

* cited by examiner

MULTI-PIECE TEXT COPY METHOD AND MOBILE TERMINAL

CROSS-REFERENCE TO RELATED APPLICATION

The present application is the U.S. national phase of PCT Application No. PCT/CN2018/121745 filed on Dec. 18, 2018, which claims a priority of the Chinese patent application No. 201711395063.1 filed on Dec. 21, 2017, which is incorporated herein by reference in its entirety.

TECHNICAL FIELD

The present disclosure relates to the field of communication technology, in particular to a multi-piece text copy method and mobile terminal.

BACKGROUND

Along with the rapid development of mobile terminals, physical keyboard has been gradually replaced with virtual keyboard, and a user may input information conveniently through operating the virtual keyboard. However, when the user needs to copy information displayed on a screen of the mobile terminal, there still exist defects for a copy mode.

For example, when the user is browsing a webpage and multiple pieces of text at different positions in the webpage are to be copied, the user needs to copy the multiple pieces of text and paste them to target positions one by one. In this way, the mobile terminal needs to perform multiple copy and pasting operations so as to copy the information.

It can been seen that, in the related art, the operating mode of the mobile terminal is complex when text information is copied.

SUMMARY

In one aspect, the present disclosure provides in some embodiments a multi-piece text copy method, including:
  receiving N inputs from a user; displaying N text editing controls in response to the N inputs respectively;
  acquiring N pieces of target text selected by the N text editing controls respectively;
  receiving a first input from the user at a target position in a first text information; and
  copying the N pieces of target text to the target position in response to the first input;

Each text editing control includes a text selection identifier and a control addition identifier, N is an integer greater than 1, and any two of the N pieces of target text are not adjacent to each other.

In another aspect, the present disclosure provides in some embodiments a multi-piece text copy method, including:
  a first reception module configured to receive N inputs from a user;
  a first display module configured to display N text editing controls in response to the N inputs received by the first reception module respectively;
  a first acquisition module configured to acquire N pieces of target text selected through the N text editing controls displayed by the first display module respectively;
  a second reception module configured to receive a first input from the user at a target position in first text information; and
  a copy module configured to copy the N pieces of target text to the target position in response to the first input received by the second reception module.

Each text editing control includes a text selection identifier and a control addition identifier, N is an integer greater than 1, and any two of the N pieces of target text are not adjacent to each other.

In yet another aspect, the present disclosure provides in some embodiments a mobile terminal, including a memory, a processor, and a computer program stored in the memory and executed by the processor. The processor is configured to execute the computer program so as to implement the above-mentioned multi-piece text copy method.

In still yet another aspect, the present disclosure provides in some embodiments a computer-readable storage medium which stores a computer program. The computer program is executed by a processor so as to implement the above-mentioned multi-piece text copy method.

BRIEF DESCRIPTION OF THE DRAWINGS

FIG. 1-1 is a schematic view showing a display interface of a mobile terminal according to one embodiment of the present disclosure;

FIG. 1-2 is another schematic view showing the display interface of the mobile terminal according to one embodiment of the present disclosure;

FIG. 1-3 is yet another schematic view showing the display interface of the mobile terminal according to one embodiment of the present disclosure;

FIG. 1-4 is still yet another schematic view showing the display interface of the mobile terminal according to one embodiment of the present disclosure;

FIG. 2 is a schematic view showing the mobile terminal according to one embodiment of the present disclosure; and FIG. 3 is another schematic view showing the mobile terminal according to one embodiment of the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
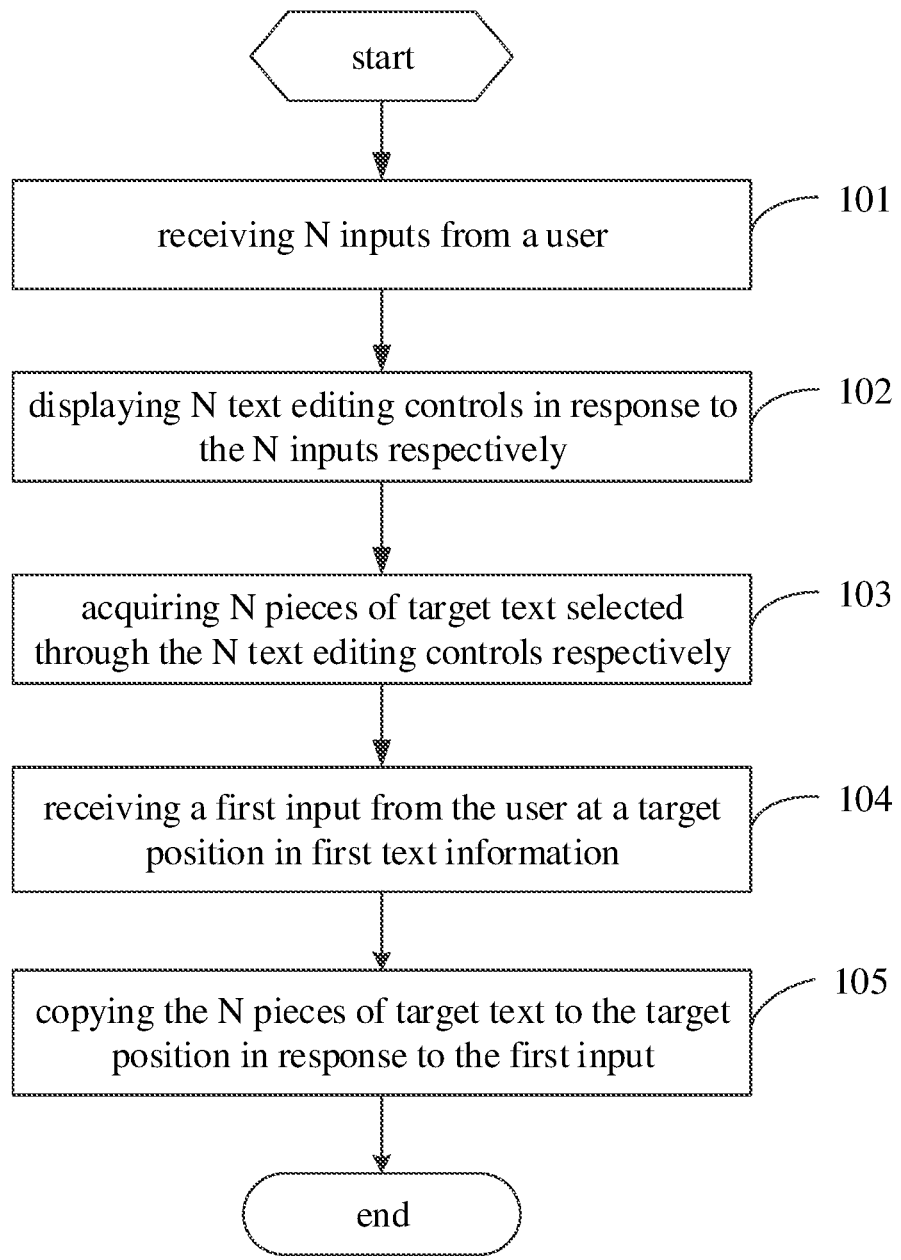
FIG. 1 is a flow chart of a multi-piece text copy method according to one embodiment of the present disclosure.
Figure 1:
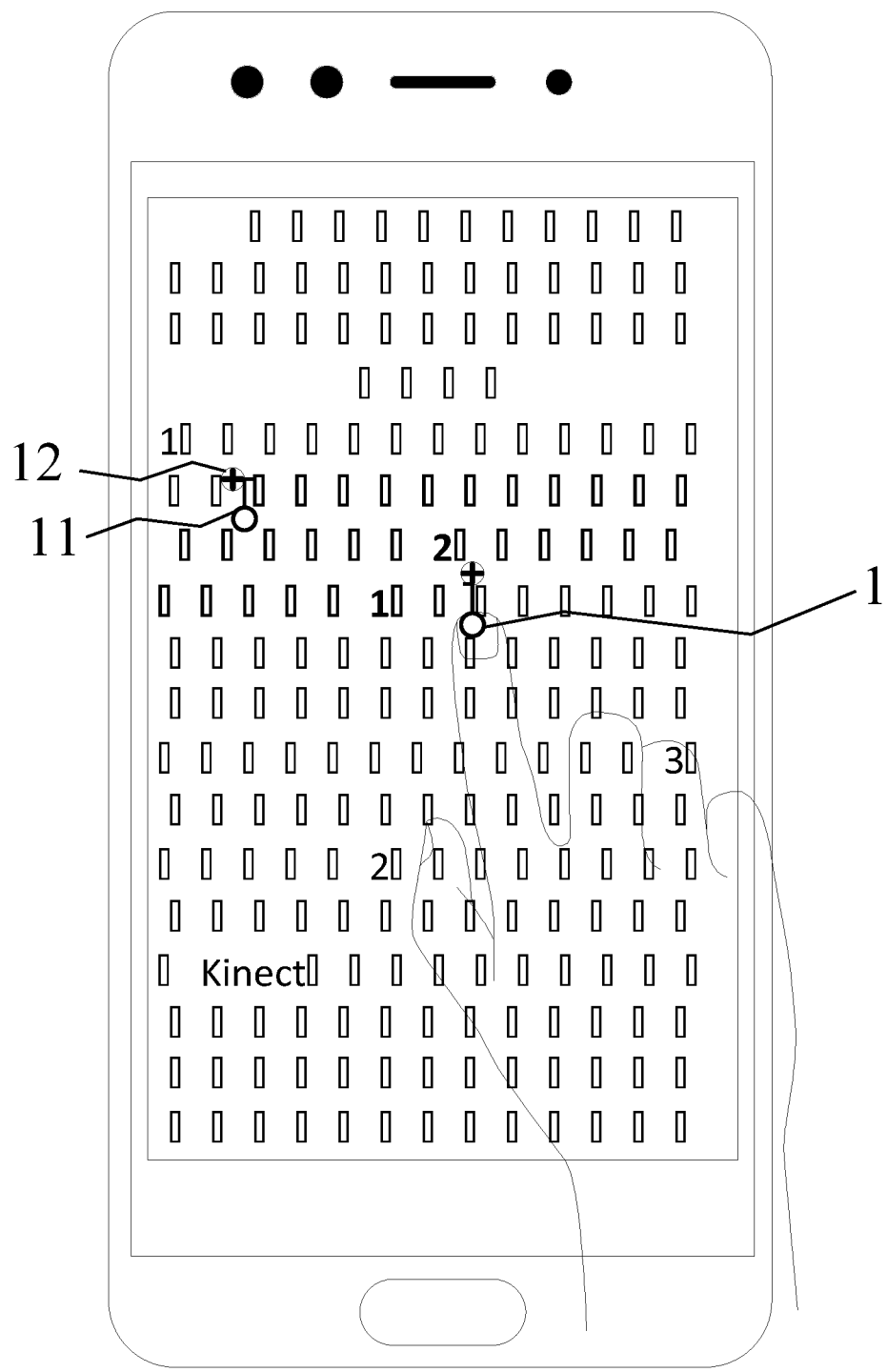

As shown in FIG. 1, the present disclosure provides in some embodiments a multi-piece text copy method which includes the following steps:

Step 101: receiving N inputs from a user, wherein N is an integer greater than 1.

In this step, when N operations are performed by the user on a screen of the mobile terminal, the mobile terminal may receive the N inputs from the user, and the value of N may correspond to the quantity of pieces of to-be-copied text. For example, when two pieces of the text need to be copied, the user may perform two operations on the mobile terminal.

The N inputs may be the same, or different from each other, and the N inputs may be a click input, slide input or press input, or the like.

In this step, a first input on second text information may be received from the user.

The second text information may be text information in the to-be-copied text. The first input may be performed by the user at any position in a display interface during the copy of the text information.

Step 102: displaying N text editing controls in response to the N inputs respectively. Each text editing control may include a text selection identifier and a control addition identifier.

In this step, upon the receipt of each input from the user, the mobile terminal may display one text editing control, and this text editing control may include a text selection identifier for determining a text selection area and a control addition identifier for adding one or more text editing controls. The text selection identifier may include a start identifier for determining a start position of a to-be-selected text, and an end identifier for determining an end position of the to-be-selected text. For example, a text editing control 1 may be displayed as shown in FIG. 1-1.

In this step, upon the receipt of the first input on the second text information from the user, a first text editing control may be displayed at an input position of the first input in response to the first input.

The input position of the first input may be a position in the screen corresponding to the input when the input is performed by the user. The mobile terminal may display the text editing control, i.e., the first editing control, at the input position. At this time, the user may operate the text editing control, so as to determine a text content to be selected by the text editing control. For example, the user may drag the text selection identifier in the text editing control, so as to adjust the position of the text editing control in the second text information, thereby to determine the to-be-selected text content.

In this way, the user may determine the quantity of inputs with respect to the text information in accordance with the quantity of pieces of the to-be-copied text information. When the quantity of pieces of the text to be selected is relatively small, a small quantity of inputs may be performed by the user, and when the quantity of pieces of the text to be selected is relatively large, a large quantity of inputs may be performed by the user. Hence, it is able to select the text flexibly, so that the user's operation is convenient and fast.

In a possible embodiment of the present disclosure, subsequent to receiving the first input on the second text information from the user, the multi-piece text copy method may further include receiving an $N^{th}$ input on a first target text editing control of N-1 text editing controls from the user, and the displaying the N text editing controls in response to the N inputs respectively may include displaying an $N^{th}$ text editing control at an input end position of the $N^{th}$ input in response to the $N^{th}$ input.

In this step, when a plurality of pieces of text information need to be selected, the user may perform the inputs on any one of the text editing controls that have already been displayed.

The first target text editing control may be understood as any one of the N-1 text editing controls that have already been displayed. The input end position of the $N^{th}$ input may be understood as a position in the screen when the $N^{th}$ input is performed by the user and the finger of the user leaves off from the screen, e.g., a position in the screen when a dragging operation performed by the finger of the user has been ended.

In this way, the user may call out a plurality of text editing controls by performing the inputs on the text editing controls that have already been displayed, so as to rapidly select a plurality of inconsecutive pieces of the text.

Figures 1, 2:
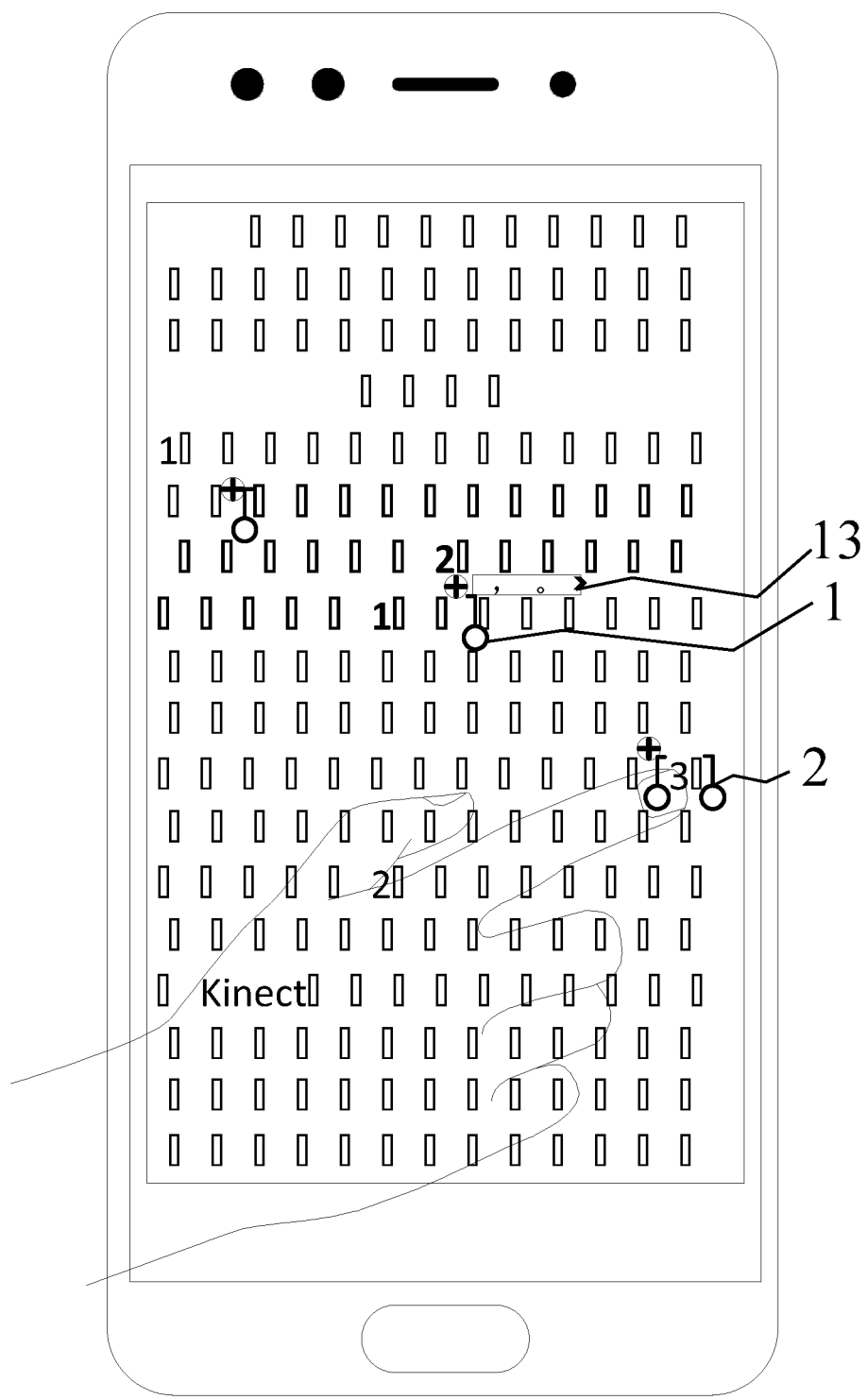

For example, as shown in FIG. 1-1, the user may perform the first input on the text information, and the mobile terminal may display the text editing control 1 in response to the first input. The text editing control 1 may include a text selection identifier 11 and a control addition identifier 12. At this time, the user may adjust the position of the displayed text selection identifier, so as to determine the to-be-selected text area. When a plurality of pieces of the text need to be selected, the user may continue to perform a second input on the control addition identifier 12 of the text editing control 1, and the mobile terminal may display a text editing control 2 in response to the second input, as shown in FIG. 1-2. When another input is performed by the user on any control addition identifier on the text editing control that has already been displayed, the mobile terminal may display the $N^{th}$ text editing control at the input end position.

In this way, the user may perform a plurality of inputs according to the practical need, so as to select a plurality of pieces of the text information flexibly, so that the user's operation is convenient and fast.

When the $N^{th}$ input is a sliding operation with the control addition identifier of the first target text editing control as a slide start position, in this step, the $N^{th}$ text editing control may be display at a slide end position of the slide operation in response to the $N^{th}$ input.

In this step, the user may perform the input on the control addition identifier of any one of the text editing controls that have already been displayed. To be specific, the user may perform the slide operation with the control addition identifier as a start point. When the finger of the user leaves from the screen, the mobile terminal may acquire the slide end point of the slide operation, and add a text editing control at a position where the slide end point is located. The user may perform the input at a position of the text selection identifier of the text editing control, so as to adjust the to-be-selected text area.

For example, when five text editing controls have already been displayed in the text, the user may perform the slide operation on the control addition identifier of any one of the five text editing controls. In response to the user's slide operation, the control addition identifier may move, and when the user's finger leaves off from the screen, one text editing control may be displayed at the position where the user's finger leaves off from the screen. At this time, the user may continue to adjust the position of the text editing control, so as to accurately select the to-be-copied text.

In this way, the user may determine a display position of the text editing control by controlling the dragging end position of the control addition identifier, so as to rapidly select the to-be-selected text. In addition, the user may add the text editing controls one by one, and adjust the position of each text editing control so as to acquire content of the to-be-selected text conveniently, so that the user's operation is convenient and fast.

In a possible embodiment of the present disclosure, each text editing control may further include a symbol selection identifier. Subsequent to displaying the N text editing controls in response to the N inputs respectively, the multi-piece text copy method may further include: receiving a dragging input on a symbol selection identifier of a second target text editing control from the user; controlling the symbol selection identifier of the second target text editing control to move in response to the dragging input; acquiring the dragging end position of the dragging input; receiving a second input on the symbol selection identifier of the second target text editing control from the user; and adding a target symbol selected by the second input to the dragging end position.

In the embodiments of the present disclosure, the symbol selection identifier may include a plurality of symbols, and the user may perform the input on the symbol selection identifier. To be specific, each symbol may be a punctuation mark, an emotion icon, or any other symbol.

To be specific, the user may perform the dragging input on the symbol selection identifier of the second target text editing control. When the dragging input has been finished, the mobile terminal may acquire the dragging end position. The dragging end position may be just a position when the user's finger leaves off from the screen, i.e., a position where the symbol is to be added. At this time, the user may perform the second input on any symbol in the symbol selection identifier, and the mobile terminal may determine the target symbol selected by the second input and add the target symbol to the dragging end position.

In addition, the user may also directly perform the dragging input on the target symbol in the symbol selection identifier. When the dragging input has been finished, the mobile terminal may acquire the dragging end position and add the target symbol to the dragging end position. When the symbol selection identifier is unfolded, the mobile terminal may display more symbols, and the user may perform the input on any symbol so as to add the symbol into the text. In this way, the user may perform the input on the symbol selection identifier of the text editing control, so as to rapidly add the symbol into the text, so that the user's operation is convenient, fast and flexible.

Figures 1, 2, 3:
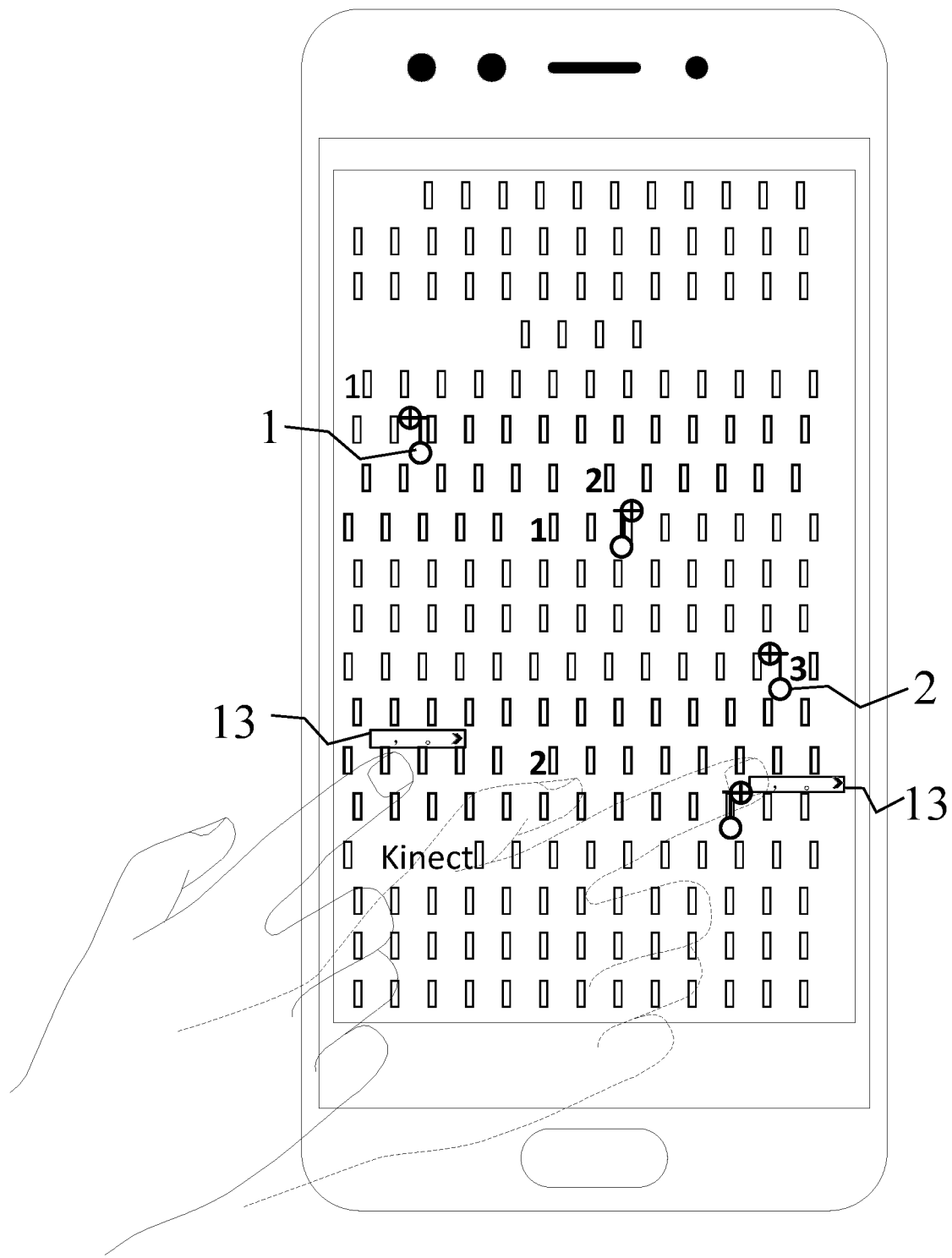
Figures 1, 2, 3, 4:
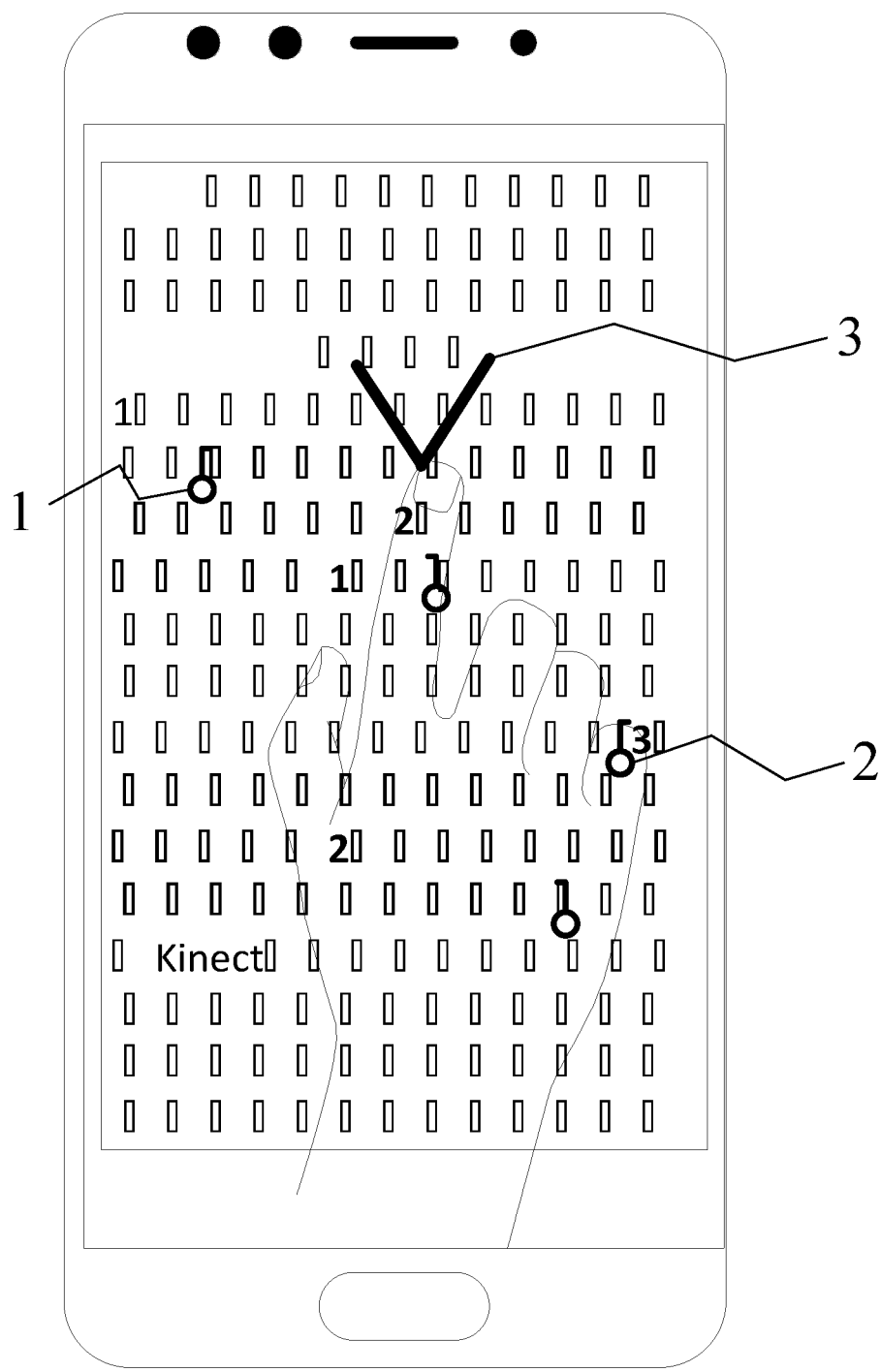
Figure 2:
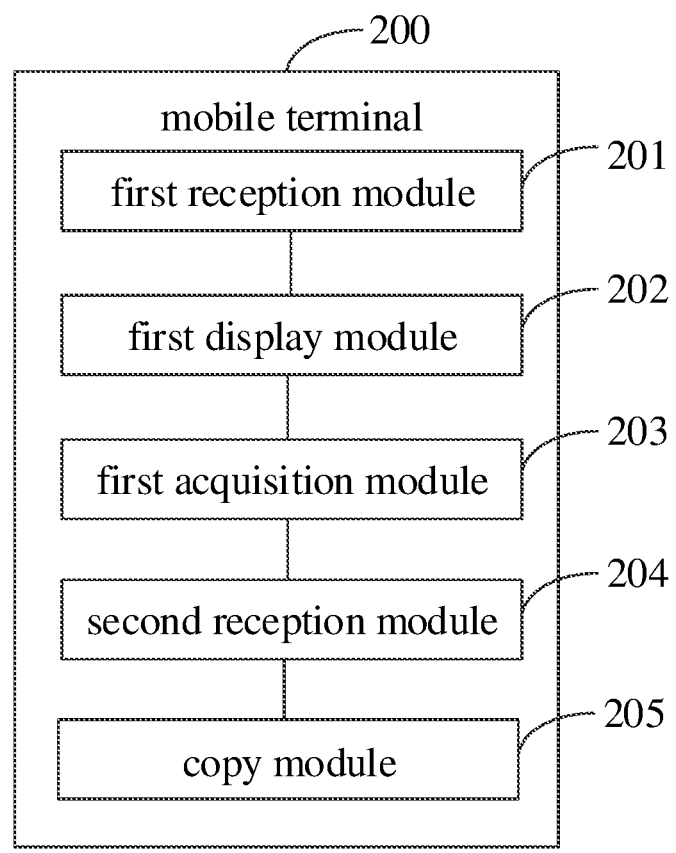
Figure 3:
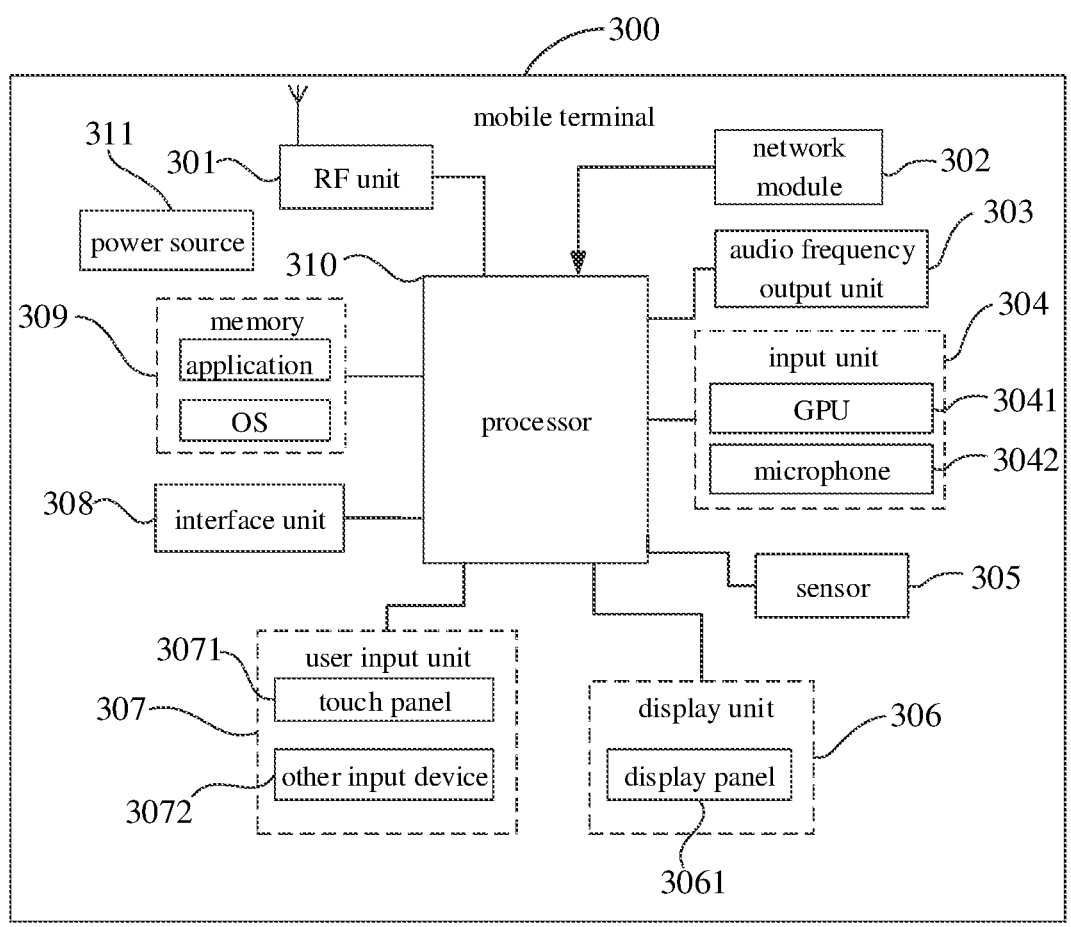

For example, as shown in FIG. 1-3, the text editing control may include a symbol selection identifier 13, and the user may perform the dragging input on the symbol selection identifier of an editing control, so as to drag the symbol selection identifier 13 to any position in the text selected by the text editing control, i.e., the position where the symbol is to be added.

After the determination of the position of the symbol to be added, the user may continue to move the finger to a symbol in the symbol selection identifier, so as to select the symbol to be added. When the user's finger leaves off from the screen, the mobile terminal may add the selected symbol to the determined position.

In addition, after the determination of the position of the symbol to be added, the user's finger may also leave from the screen, and perform the input on the to-be-added symbol in the symbol selection identifier again. The mobile terminal may add the selected symbol to the determined position, so as to perform the separation of the text. When it needs to cancel the separation, the user may perform a press operation on the added punctuation mark, so as to hide the punctuation mark and cancel the separation.

In this way, the user may add the symbols into the plurality of pieces of the text that has been selected, so as to edit the text, so that the user's operation is convenient, fast and flexible, and the information editing efficiency is increased.

In a possible embodiment of the present disclosure, during the user drags the symbol selection identifier of the second target text editing control, the multi-piece text copy method may further include: displaying a preset cursor at a preset side of the symbol selection identifier, the predetermined cursor being capable of moving following the symbol selection identifier; and determining the movement end position of the preset cursor as the dragging end position.

The preset cursor may be an identifier for indicating the position of the symbol selection identifier in the text, and a position where the preset cursor is located may be just a position where the symbol needs to be added. In this way, it is able for the user to accurately acquire the position where the symbol is to be added.

In the embodiments of the present disclosure, when dragging the symbol selection identifier, a cursor may be displayed at a side of the symbol selection identifier, so as to indicate the position of the symbol selection identifier in the text in real time. When the symbol selection identifier moves, the preset cursor may move in the text along the movement direction of the symbol selection identifier. In the embodiments of the present disclosure, the preset cursor may be displayed between two adjacent pieces of text, and move back and forth between gaps of the pieces of the text along with the movement of the symbol selection identifier. When the dragging input has been finished, the position of the preset cursor in the text may be just the dragging end position, and the mobile terminal may add the symbol at the dragging end position.

In this way, through displaying the preset cursor in the text, it is able for the user to view the position of the symbol selection identifier in the text conveniently, thereby to rapidly and accurately add the symbol in the symbol selection identifier to the position where the symbol is to be added.

In a possible embodiment of the present disclosure, subsequent to displaying the N text editing controls in response to the N inputs respectively, the multi-piece text copy method may further include: receiving a third input on a control addition identifier of a third target text editing control in the N text editing controls from the user; and deleting the third target text editing control in response to the third input, and cancelling a target text selected by the third target text editing control.

The third target text editing control may be any one of the N text editing controls, and the user may perform the third input on the control addition identifier of the third target text editing control so as to delete the third target text editing control. At this time, the target text selected by the third target editing control may not be in a selected state any more.

For example, the user may slide the control addition identifier to an edge of the screen, so as to delete the text editing control.

For another example, as shown in FIG. 1-1, the user may move the control addition identifiers at the start position and the end position of the text editing control to a same position in the screen, and the mobile terminal may delete the third target text editing control in response to the user's input.

In this way, when the user needs to cancel a part of the plurality of pieces of the to-be-copied text, the user may perform the input on the control addition identifier of the third target text editing control, so as to cancel the part of the plurality of pieces of the to-be-copied text. This operation is simple and convenient, so it is able to edit the text flexibly.

When the third input is the dragging operation performed by the user on the control addition identifier of the third target text editing control, the deleting the third target text editing control in response to the third input and cancelling the target text selected by the third target text editing control may include, in the case that the dragging speed of the dragging operation is greater than a preset threshold and the dragging end position is within a preset area, deleting the third target text editing control and cancelling the target text selected by the third target text editing control.

In the embodiments of the present disclosure, when the dragging operation is performed by the user on the control addition identifier of the third target text editing control, the mobile terminal may detect the dragging speed of the dragging operation, and determine whether the dragging speed is greater than the preset threshold. The preset threshold may be a speed value preset by the mobile terminal and stored in the mobile terminal.

When the dragging speed is greater than the preset threshold, the mobile terminal may further detect the dragging end position, and the dragging end position may be a position where the user's finger leaves off from the screen during the dragging operation. The mobile terminal may determine whether the dragging end position is within the preset area, and the preset area may be an area preset by the mobile terminal and stored in the mobile terminal. This area may be any area in the display interface of the mobile terminal, e.g., a preset area adjacent to the edge of the screen.

When the dragging speed of the dragging operation is greater than the preset threshold and the dragging end position is within the preset area, the mobile terminal may delete the third target text editing control, and cancel the target text selected by the third target text editing control. After the selection of the target text has been cancelled, the mobile terminal may delete the selection identifier of the target text.

In addition, the mobile terminal may also determine the dragging speed and the dragging end position of the dragging operation simultaneously, delete the third target text editing control when each of the dragging speed and the dragging end position has met a preset condition, and cancel the target text.

In this way, the mobile terminal may rapidly delete the pieces of the text that do not need to be selected, so as to rapidly edit the text, so that the user's operation is convenient and fast.

When the third target text editing control includes a first control addition identifier and a second control addition identifier and the third input is the dragging operation performed by the user on the first control addition identifier, the deleting the third target text editing control in response to the third input and cancelling the target text selected by the third target text editing control may include: controlling the first control addition identifier to move in response to the third input; and in the case that the movement end position of the first control addition identifier overlaps the second control addition identifier, deleting the third target text editing control, and cancelling the target text selected by the third target text editing control.

In the embodiments of the present disclosure, the mobile terminal may display the first control addition identifier and the second control addition identifier at the start position and the end position of the text selected by the third target text editing control, and the user may perform the dragging operation on the first control addition identifier and the second control addition identifier.

To be specific, the user may perform the dragging operation on any one of the first control addition identifier and the second control addition identifier, or on both of them simultaneously. For example, as shown in FIG. 1-1, the user may drag the two control addition identifiers 12 at the start position and the end position of the text selected by the text editing control 1 simultaneously, or drag any one of the two control addition identifiers 12. In this way, the user may perform the operation according to the operation habit, so that the user's operation is flexible.

The following description will be given when the dragging operation is performed by the user on the first control addition identifier.

When the first control addition identifier is dragged by the user, the first control addition identifier may move following the user's finger. When the movement is finished, i.e., the finger leaves from the screen, and there is an overlapping area between the first control addition identifier and the second control addition identifier, the third target text editing control may be deleted, and the target text selected by the third target text editing control may be cancelled.

In this way, it is able for the user to rapidly cancel the pieces of the text that do not need to be selected, and delete the text editing control through the operation on the control addition identifier, thereby to edit the text, so that the user's operation is convenient and fast.

In a possible embodiment of the present disclosure, subsequent to displaying the N text editing controls in response to the N inputs respectively, the multi-piece text copy method may further include: receiving a dragging input of a fourth text editing control from the user; controlling the fourth text editing control to move in response to the dragging input; and in the case that the movement end position of the fourth text editing control overlaps a fifth text editing control, merging consecutive pieces of the text between the first character in the first target text selected by the fourth text editing control and the last character in the second target text selected by the fifth text editing control into a target piece of the text.

In the embodiments of the present disclosure, when the user drags the fourth text editing control, the fourth text editing control may move following the user's finger. When the movement is finished, i.e., the finger leaves from the screen, and there is an overlapping area between the fourth text editing control and the fifth text editing control, a piece of the text selected by the fourth text editing control, a piece of the text selected by the fifth text editing control, and a piece of the text between the fourth text editing control and the fifth text editing control may be merged into one piece of text.

During the implementation, the user may also perform the dragging operation on the fifth text editing control. When the dragging operation is finished and there is an overlapping area between the fifth text editing control and the fourth text editing control, or there is an overlapping text between the piece of the text selected by the fifth text editing control and the piece of the text selected by the fourth text editing control, the piece of the text selected by the fourth text editing control, the piece of the text selected by the fifth text editing control, and the piece of the text between the fourth text editing control and the fifth text editing control may be merged into one piece of text. In this way, it is able for the user to perform the input through the text editing controls, thereby to rapidly merge a plurality of pieces of text into one piece of text.

In addition, the user may further perform the dragging operation on the fourth text editing control and the fifth text editing control simultaneously. When the dragging operation is finished and there is an overlapping area between the fourth text editing control and the fifth text editing control, the piece of the text selected by the fourth text editing control, the piece of the text selected by the fifth text editing control, and the piece of the text between the fourth text editing control and the fifth text editing control may be merged into one piece of text.

In this way, it is able for user to perform the operation conveniently, thereby to enable the mobile terminal to merge the pieces of the text rapidly and increase the text editing efficiency.

In a possible embodiment of the present disclosure, subsequent to displaying the N text editing controls in response to the N inputs respectively, the multi-piece text copy method may further include: receiving a fourth input on the N text editing controls from the user; sorting N pieces of target text selected by the N text editing controls in response to the fourth input; and displaying the sorted N pieces of target text.

In the embodiments of the present disclosure, after the determination of the N pieces of target text selected by the N text editing controls, the user may perform the input on the N pieces of target text or the N text editing controls, so as to sort the N pieces of target text. The mobile terminal may display the sorted N pieces of target text, so as to process the sorted pieces of target text, thereby to edit the text flexibly.

To be specific, when the fourth input is click operations performed by the user on the N text editing controls, the sorting the N pieces of target text selected by the N text editing controls in response to the fourth input may include: acquiring the click order of the click operations; and adjusting the order of the N pieces of target text selected by the N text editing controls in accordance with the click order.

Each click operation may be understood a click operation performed by the user on the text editing control. The mobile terminal may detect N click operations on the N text editing controls so as to acquire the click order of the click operations and the pieces of text corresponding to the click operations respectively, and then sort the N pieces of target text selected by the N text editing controls.

For example, when the user needs to sort three pieces of text and a second text editing control corresponding to a second piece of text, a first text editing control corresponding to a first piece of text and a third text editing control corresponding to a third piece of text are clicked by the user sequentially, the mobile terminal may adjust the order of the three pieces of text as the second piece of text, the first piece of text and the third piece of text. This sorting mode is simple, so it is able to facilitate the user's operation.

During the implementation, the mobile terminal may further merely sort the pieces of text selected by the clicked text editing controls, and the pieces of text not selected may be sorted after the selected pieces of text in the original order. When the user merely needs to adjust the sorting order of parts of the pieces of text, the user may merely perform the click operations on the parts of the pieces of text. This implementation mode is simple, so it is able to increase the text editing efficiency.

In addition, after the determination of the N pieces of target text, the mobile terminal may display a sorting control in the screen, and the sorting control may be used to indicate the user to sort the N pieces of target text, so as to prompt the user to sort the pieces of text.

When the fourth input is a dragging operation performed by the user on the N text editing controls, the sorting the N pieces of target text selected by the N text editing controls respectively in response to the fourth input may include controlling the N pieces of target text selected by the N text editing controls respectively to move in response to the dragging operation.

In the embodiments of the present disclosure, the user may perform the dragging operation on each of the N text editing controls, so as to sort the N pieces of target text. During the dragging operation performed by the user on each text editing control, the piece of text selected by the text editing control may move along with the user's dragging operation. When the dragging operation is ended, i.e., the user's finger leaves off from the screen, the piece of text selected by the text editing control may stay at the position where the user's finger leaves off from the screen, and this position may be just the sorting position of the piece of text.

When the user performs the dragging operation on a plurality of text editing controls sequentially, positions of the pieces of text selected by the plurality of text editing controls may change, and the mobile terminal may determine the sorting order in accordance with the sorting position of each piece of text.

For example, the mobile terminal may display the first piece of text, the second piece of text and the third piece of text sequentially. When the dragging operation is performed by the user on the text editing control corresponding to the third piece of text to enable the third piece of text to be located before the first piece of text, the third piece of text, the first piece of text and the second piece of text may be sorted sequentially.

In this way, it is able for the user to adjust the sorting order of the pieces of text merely through adjusting the sorting order of parts of the pieces of text, the sorting way is fast and intuitive.

Step 103: acquiring the N pieces of target text selected by the N text editing controls respectively, any two of the N pieces of target text being not adjacent to each other.

Each target text editing control may include a text selection identifier. The mobile terminal may acquire a start position and an end position of each text selection identifier in the text, and take a piece of text between the start position and the end position as the target text selected by the text editing control corresponding to the text selection identifier.

After the acquisition of the N pieces of target text, the N pieces of target text may be copied, forwarded or collected.

Step 104: receiving the first input from the user at a target position in first text information.

The first text information may be information in a current display interface of the mobile terminal, or information displayed after a display interface has been switched. The target position may be any position in the first text information. The user may perform the first input at the target position, and the first input may be a slide input, a press input or a click input.

In this step, when the first input is an input of a target trajectory performed by the user at the target position in the first text information, the copying the N pieces of target text to the target position in response to the first input may include: acquiring one or more target characteristic points of the target trajectory; and copying the N pieces of target text to the target position in the first text information indicated by the target characteristic point.

To be specific, the target trajectory may be a slide trajectory acquired when a slide operation is performed by the user at the target position, and the target characteristic point of the target trajectory may be the point having a position indication feature on the target trajectory.

For example, as shown in FIG. 1-4, when the slide operation is performed by the user at the target position in the first text information and the target trajectory of the slide operation is a V-shaped line, the mobile terminal may acquire the target characteristic point of the target trajectory, i.e., an inflection point of the V-shaped line, and determine the position of the inflection point in the first text information, i.e., the target position, so as to copy the N pieces of target text to the target position.

In this way, it is able for the user to rapidly add a plurality of pieces of text to any position in the text, so that the user's operation is convenient and fast and the text editing efficiency is increased.

In this step, when the first input is the press input performed by the user at the target position in the first text information, the copying the N pieces of target text to the target position in response to the first input may include: displaying a preset cursor at the target position in response to the press input; and copying the N pieces of target text to the position where the preset cursor is located.

In the embodiments of the present disclosure, when the press input is performed by the user at the target position in the first text information, the preset cursor may be displayed by the mobile terminal at the position where the press input is performed. The preset cursor may be located between two adjacent pieces of text, and the mobile terminal may paste the N pieces of target text to the position where the preset cursor is located, so as to add the text. For example, when the first text information includes a sentence "接收语音输入" and the user performs the press input between characters "收" and "语", the preset cursor may be displayed by the mobile terminal between the characters "收" and "语", and the N pieces of target text may be pasted by the mobile terminal between the characters "收" and "语". In this way, it is able for the user to accurately acquire the position of the text is to be pasted.

During the implementation, after the preset cursor has been displayed at the target position, the user may drag the preset cursor so as to adjust the position of the preset cursor, thereby to acquire a more accurate pasting position. After the adjustment of the position of the preset cursor, the user may perform the input again, so as to enable the mobile terminal to paste the N pieces of target text to the position where the preset cursor is located.

In this way, through performing the input in the text, it is able for the user to accurately copy the N pieces of target text to a position where the text is to be added, so that the user's operation is simple, convenient and fast.

In a possible embodiment of the present disclosure, subsequent to receiving the first input from the user at the target position in the first text information, the multi-piece text copy method may further include: displaying a preset virtual keyboard at the target position in response to the first input; receiving a character input from the user using the virtual keyboard; and adding the character inputted by the user to the target position in response to the character input.

The target position may be a position of the target characteristic point of the operating trajectory corresponding to the first input. For example, when the slide operation is performed by the user in the text and the slide trajectory is a V-shaped line, the mobile terminal may display the virtual keyboard at a position corresponding to the inflection point of the V-shaped line, and add the character inputted through the virtual keyboard to the target position.

In addition, the mobile terminal may also display the virtual keyboard at any other position in the interface currently displayed, and display the cursor at the target position, so as to facilitate the user to determine the position where the text is to be added.

In this way, it is able for the user to rapidly call out the virtual keyboard through preforming the input in the text, thereby to add the text at any position at any time, so that the addition of text is simple and edition of text is flexible.

Step 105: copying the N pieces of target text to the target position in response to the first input.

In this step, after the copy of the N pieces of target text, the N pieces of target text may be added to the target position. In this way, it is able to copy multiple pieces of text and edition of text is flexible.

In the embodiments of the present disclosure, the multi-piece text copy method may be applied to the mobile terminal, e.g., a mobile phone, a tablet personal computer, a laptop computer, a Personal Digital Assistant (PDA), a Mobile Internet Device (MID) or a wearable device.

According to the multi-piece text copy method in the embodiments of the present disclosure, the N inputs may be received from the user, the N text editing controls may be displayed respectively in response to the N inputs, the N pieces of target text selected by the N text editing controls may be acquired, the first input may be received from the user at the target position in the first text information, and the N pieces of target text may be copied to the target position in response to the first input. Each text editing control may include the text selection identifier and the control addition identifier, N is an integer greater than 1, and any two of the N pieces of target text may not be adjacent to each other. In this way, it is able for the user to rapidly select a plurality of pieces of text in the text not adjacent to each other and copy the plurality of pieces of text, thereby to increase the text copy efficiency.

As shown in FIG. 2, the present disclosure further provides in some embodiments a mobile terminal 200 which includes a first reception module 201, a first display module 202, a first acquisition module 203, a second reception module 204 and a copy module 205. The first reception module 201 is connected to the first display module 202, the first display module 202 is connected to the first acquisition module 203, the first acquisition module 203 is connected to the second reception module 204, and the second reception module 204 is connected to the copy module 205.

The first reception module 201 is configured to receive N inputs from a user. The first display module 202 is configured to display N text editing controls in response to the N inputs received by the first reception module 201 respectively. The first acquisition module 203 is configured to acquire N pieces of target text selected by the N text editing controls displayed by the first display module 202. The second reception module 204 is configured to receive a first input from the user at a target position in first text information. The copy module 205 is configured to copy the N pieces of target text to the target position in response to the first input received by the second reception module 204. Each text editing control may include a text selection identifier and a control addition identifier, N is an integer greater than 1, and any two of the N pieces of target text may not be adjacent to each other.

In a possible embodiment of the present disclosure, the first reception module is further configured to receive a first input from the user in second text information, and the first display module is further configured to display a first text editing control at an input position of the first input in response to the first input.

In a possible embodiment of the present disclosure, the mobile terminal may further include a third reception module configured to receive an $N^{th}$ input from the user on a first target text editing control of N−1 text editing controls. The first display module is further configured to display the $N^{th}$ text editing control at an input end position of the $N^{th}$ input in response to the Nth input.

In a possible embodiment of the present disclosure, the $N^{th}$ input may be a slide operation with a control addition identifier of the first target text editing control as a slide start position, and the first display module is further configured to display the $N^{th}$ text editing control at a slide end position of the slide operation in response to the $N^{th}$ input.

In a possible embodiment of the present disclosure, each text editing control may further include a symbol selection identifier. The mobile terminal may further include: a fourth reception module configured to receive a dragging input from the user on a symbol selection identifier of a second target text editing control; a first movement module configured to control the symbol selection identifier of the second target text editing control to move in response to the dragging input received by the fourth reception module; a second acquisition module configured to acquire a dragging end position of the dragging input; a fifth reception module configured to receive a second input from the user on the symbol selection identifier of the second target text editing control; and a first addition module configured to add a target symbol selected by the second input received by the fifth reception module to the dragging end position.

In a possible embodiment of the present disclosure, the mobile terminal may further include a second display module configured to display a preset cursor at a preset side of the symbol selection identifier, the preset cursor is capable of moving following the symbol selection identifier, and the second acquisition module is further configured to determine a movement end position of the preset cursor displayed by the second display module as the dragging end position.

In a possible embodiment of the present disclosure, the mobile terminal may further include: a sixth reception module configured to receive a third input from the user on a control addition identifier of a third target text editing control of the N text editing control; and a deletion module configured to delete the third target text editing control in response to the third input received by the sixth reception module, and cancel a target text selected by the third target text editing control.

In a possible embodiment of the present disclosure, the third input may be a dragging operation performed by the user on the control addition identifier of the third target text editing control. The deletion module is further configured to, in the case that a dragging speed of the dragging operation is greater than a preset threshold and the dragging end position is within a preset area, delete the third target text editing control, and cancel the target text selected by the third target text editing control.

In a possible embodiment of the present disclosure, the third target text editing control may include a first control addition identifier and a second control addition identifier, and the third input may be a dragging operation performed by the user on the first control addition identifier. The deletion module may include: a movement sub-module configured to control the first control addition identifier to move in response to the third input; and a deletion sub-module configured to, in the case that a movement end position of the first control addition identifier controlled by the movement sub-module overlaps the second control addition identifier, delete the third target text editing control and cancel the target text selected by the third target text editing control.

In a possible embodiment of the present disclosure, the mobile terminal may further include: a seventh reception module configured to receive a dragging input from the user on a fourth text editing control; a second movement module configured to control the fourth text editing control to move in response to the dragging input received by the seventh reception module; and a merging module configured to, in the case that a movement end position of the fourth text editing control controlled by the second movement module overlaps a fifth text editing control, merge consecutive pieces of text between a first character in a first target text selected by the fourth text editing control and a last character in a second target text selected by the fifth text editing control into a piece of target text.

In a possible embodiment of the present disclosure, the mobile terminal may further include: an eighth reception module configured to receive a fourth input from the user on the N text editing controls; a sorting module configured to sort the N pieces of target text selected by the N text editing controls respectively in response to the fourth input received by the eighth reception module; and a third display module configured to display the N pieces of target text sorted by the sorting module.

In a possible embodiment of the present disclosure, the fourth input may be click operations performed by the user on the N text editing controls. The sorting module may include: a first acquisition sub-module configured to acquire a click order of the click operations; and an adjustment sub-module configured to adjust an order of the N pieces of target text selected by the N text editing controls respectively in accordance with the click order acquired by the first acquisition sub-module.

In a possible embodiment of the present disclosure, the fourth input may be a dragging operation performed by the user on the N text editing controls, and the sorting module is further configured to control the N pieces of target text selected by the N text editing controls respectively to move in response to the dragging operation.

In a possible embodiment of the present disclosure, the first input may be an input of a target trajectory performed by the user at the target position in the first text information. The copy module may include: a second acquisition sub-module configured to acquire a target characteristic point of the target trajectory; and a first copy sub-module configured to copy the N pieces of target text to the target position in the first text information indicated by the target characteristic point acquired by the second acquisition sub-module.

In a possible embodiment of the present disclosure, the first input may be a press input performed by the user at the target position in the first text information. The copy module may include: a first display sub-module configured to display a preset cursor at the target position in response to the press input; and a second copy sub-module configured to copy the N pieces of target text to a position of the preset cursor displayed by the first display sub-module.

In a possible embodiment of the present disclosure, the mobile terminal may further include: a fourth display module configured to display a preset virtual keyboard at the target position in response to the first input; a ninth reception module configured to receive a character input from the user through the virtual keyboard displayed by the fourth display module; and a second addition module configured to add a character inputted by the user to the target position in response to the character input received by the ninth reception module.

The mobile terminal 200 in the embodiments of the present disclosure is capable of implementing the above-mentioned multi-piece text copy method, which will thus not be particularly defined herein.

According to the embodiments of the present disclosure, the N inputs may be received from the user, the N text editing controls may be displayed respectively in response to the N inputs, the N pieces of target text selected by the N text editing controls may be acquired, the first input may be received from the user at the target position in the first text information, and the N pieces of target text may be copied to the target position in response to the first input. Each text editing control may include the text selection identifier and the control addition identifier, N is an integer greater than 1, and any two of the N pieces of target text may not be adjacent to each other. As a result, it is able for the user to select a plurality of pieces of text in the to-be-copied text at once, and rapidly acquire the content in the information, thereby to increase the text copy efficiency.

FIG. 3 shows a hardware structure of a mobile terminal according to one embodiment of the present disclosure. The mobile terminal may include, but not limited to, a Radio Frequency (RF) unit 301, a network module 302, an audio frequency output unit 303, an input unit 304, a sensor 305, a display unit 306, a user input unit 307, an interface unit 308, a memory 309, a processor 310, and a power source 311. It should be appreciated that, the mobile terminal in FIG. 3 may not be limited thereto, i.e., it may include more or fewer members, or some members may be merged, or the members may be arranged in different modes. In the embodiments of the present disclosure, the mobile terminal may include, but not limited to, mobile phone, tablet personal computer, laptop computer, PDA, vehicle-mounted mobile terminal, wearable electronic device or pedometer.

The processor 310 is configured to: receive N inputs from a user; display N text editing controls in response to the N inputs respectively; acquire N pieces of target text selected by the N text editing controls; receive a first input from the user at a target position in first text information; and copy the N pieces of target text to the target position in response to the first input. Each text editing control may include a text selection identifier and a control addition identifier, N is an integer greater than 1, and any two of the N pieces of target text may not be adjacent to each other.

In this way, it is able for the user to select a plurality of pieces of text in the to-be-copied text at once, and rapidly acquire the content in the information, thereby to increase the text copy efficiency.

In a possible embodiment of the present disclosure, the processor 310 is further configured to receive a first input from the user in second text information, and display a first text editing control at an input position of the first input in response to the first input.

In a possible embodiment of the present disclosure, the processor 310 is further configured to receive an $N^{th}$ input from the user on a first target text editing control of N−1 text editing controls, and display the $N^{th}$ text editing control at an input end position of the $N^{th}$ input in response to the $N^{th}$ input.

In a possible embodiment of the present disclosure, the $N^{th}$ input may be a slide operation with a control addition identifier of the first target text editing control as a slide start position, and the processor 310 is further configured to display the $N^{th}$ text editing control at a slide end position of the slide operation in response to the $N^{th}$ input.

In a possible embodiment of the present disclosure, each text editing control may further include a symbol selection identifier. The processor 310 is further configured to: receive a dragging input from the user on a symbol selection identifier of a second target text editing control; control the symbol selection identifier of the second target text editing control to move in response to the dragging input; acquire a dragging end position of the dragging input; receive a second input from the user on the symbol selection identifier of the second target text editing control; and add a target symbol selected by the second input to the dragging end position.

In a possible embodiment of the present disclosure, the processor 310 is further configured to: display a preset cursor at a preset side of the symbol selection identifier, the preset cursor being capable of moving following the symbol selection identifier; and determine a movement end position of the preset cursor as the dragging end position.

In a possible embodiment of the present disclosure, the processor 310 is further configured to: receive a third input from the user on a control addition identifier of a third target text editing control of the N text editing control; and delete the third target text editing control in response to the third input, and cancelling a target text selected by the third target text editing control.

In a possible embodiment of the present disclosure, the third input may be a dragging operation performed by the user on the control addition identifier of the third target text editing control. The processor 310 is further configured to, in the case that a dragging speed of the dragging operation is greater than a preset threshold and the dragging end position is within a preset area, delete the third target text editing control, and cancel the target text selected by the third target text editing control.

In a possible embodiment of the present disclosure, the third target text editing control may include a first control addition identifier and a second control addition identifier, and the third input may be a dragging operation performed by the user on the first control addition identifier. The processor 310 is further configured to: control the first control addition identifier to move in response to the third input; and in the case that a movement end position of the first control addition identifier overlaps the second control addition identifier, delete the third target text editing control and cancel the target text selected by the third target text editing control.

In a possible embodiment of the present disclosure, the processor 310 is further configured to: receive a dragging input from the user on a fourth text editing control; control the fourth text editing control to move in response to the dragging input; and in the case that a movement end position of the fourth text editing control overlaps a fifth text editing control, merge consecutive pieces of text between a first character in a first target text selected by the fourth text editing control and a last character in a second target text selected by the fifth text editing control into a piece of target text.

In a possible embodiment of the present disclosure, the processor 310 is further configured to: receive a fourth input from the user on the N text editing controls; sort the N pieces of target text selected by the N text editing controls respectively in response to the fourth input; and display the sorted N pieces of target text.

In a possible embodiment of the present disclosure, the processor 310 is further configured to: acquire a click order of click operations; and adjust an order of the N pieces of target text selected by the N text editing controls respectively in accordance with the click order.

In a possible embodiment of the present disclosure, the fourth input may be a dragging operation performed by the user on the N text editing controls, and the processor 310 is further configured to control the N pieces of target text selected by the N text editing controls respectively to move in response to the dragging operation.

In a possible embodiment of the present disclosure, the first input may be an input of a target trajectory performed by the user at the target position in the first text information. The processor 310 is further configured to: acquire a target characteristic point of the target trajectory; and copy the N pieces of target text to the target position in the first text information indicated by the target characteristic point.

In a possible embodiment of the present disclosure, the first input may be a press input performed by the user at the target position in the first text information. The processor 310 is further configured to: display a preset cursor at the target position in response to the press input; and copy the N pieces of target text to a position of the preset cursor.

In a possible embodiment of the present disclosure, the processor 310 is further configured to: display a preset virtual keyboard at the target position in response to the first input; receive a character input from the user through the virtual keyboard; and add a character inputted by the user to the target position in response to the character input.

It should be appreciated that, in the embodiments of the present disclosure, the RF unit 301 is configured to transmit and receive signals during the information transmission or phone call. To be specific, the RF unit 301 may, upon the receipt of downlink data from a base station, transmit the downlink data to the processor 310 for subsequent treatment. In addition, the RF unit 301 may transmit uplink data to the base station. Usually, the RF unit 301 may include, but not limited to, an antenna, at least one amplifier, a transceiver, a coupler, a low-noise amplifier and a duplexer. In addition, the RF unit 301 may communicate with a network and the other devices via a wireless communication system.

The network module 302 is configured to enable the mobile terminal to access the broadband Internet in a wireless manner, e.g., help the user to receive and send an e-mail, browse a web page or access a streaming media.

The audio output unit 303 is configured to convert audio data received by the RF unit 301 or the network module 302, or audio data stored in the memory 309, into an audio signal and output the audio signal as a sound. In addition, the audio output unit 303 is further configured to provide an audio output related to a specific function executed by the mobile terminal 300 (e.g., a sound occurring when a calling signal or a message has been received). The audio output unit 303 may include a loudspeaker, a buzzer and a receiver.

The input unit 304 is configured to receive an audio or video signal. It may include a Graphics Processing Unit (GPU) 3041 and a microphone 3042. The GPU 3041 is configured to process image data of a static image or video acquired by an image collection unit (e.g., a camera) in a video capturing mode or an image capturing mode, and a processed image frame may be displayed by the display unit 306. The image frame processed by the GPU 3041 may be stored in the memory 309 (or any other storage medium) or transmitted via the RF unit 301 or network module 302. The microphone 3042 is configured to receive a sound, and convert the sound into voice data. In a call mode, the processed audio data may be converted into data in a format capable of being transmitted by the RF unit 301 to a mobile communication base station.

The at least one sensor 305 may include a light sensor, a movement sensor and the other sensors. To be specific, the light sensor may include an ambient light sensor or a proximity sensor. The ambient light sensor is configured to adjust a brightness value of a display panel 3061 in accordance with ambient light. The proximity sensor is configured to turn off the display panel 3061 and/or a backlight source when the mobile terminal 300 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the mobile terminal (e.g., perform a switching operation between portrait and landscape orientations, play relevant games, and calibrate a posture of a magnetometer), and perform vibration-related functions (e.g., count steps and strikes). The sensor 305 may further include a fingerprint sensor, a pressure sensor, an iris sensor, a molecule sensor, a gyroscope, a barometer, a hygrometer, a thermometer or an infrared sensor, which will not be particularly defined herein.

The display unit 306 is configured to display information inputted by the user or provided to the user. The display unit 306 may include the display panel 3061, e.g., a Liquid Crystal Display (LCD) panel, or an Organic Light-Emitting Diode (OLED) panel.

The user input unit 307 is configured to receive digital or character information inputted by the user, and generate a key signal input related to user settings and function control of the mobile terminal. To be specific, the user input unit 307 may include a touch panel 3071 and an input device 3072. The touch panel 3071, also called as touch screen, is configured to collect a touch operation made by the user on or in proximity to the touch panel (e.g., an operation made by the user through any appropriate object or attachment (e.g., finger or stylus) on or in the proximity to the touch panel 3071). The touch panel 3071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 310, and receive and execute a command from the processor 310. In addition, the touch panel 3071 may be of a resistive type, a capacitive type, an infrared type or a surface acoustic wave (SAW) type. The other input device 3072 may include, but not limited to, a physical keyboard, a functional button (e.g., a volume control button or an on/off button), a trackball, a mouse, and a joystick, which will not be particularly defined herein.

Further, the touch panel 3071 may cover the display panel 3061. When the touch operation made on or in proximity to the touch panel 3071 has been detected, the touch panel 3071 may transmit the touch information to the processor 310, so as to determine a type of a touch event. Then, the processor 310 may control the display panel 3061 to provide a corresponding visual output in accordance with the type of the touch event. Although the touch panel 3071 and the display panel 3061 are configured as two separate members in FIG. 3, in some embodiments of the present disclosure, they may be integrated so as to achieve the input and output functions of the electronic device, which will not be particularly defined herein.

The interface unit 308 is configured to provide an interface between an external device and the mobile terminal 300. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 308 is configured to receive an input from the external device (e.g., data information and electricity) and transmit the input to one or more elements of the mobile terminal 300, or transmit data between the mobile terminal 300 and the external device.

The memory 309 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 309 may include a high-speed random access memory (RAM), or a non-volatile memory (e.g., at least one magnetic disk or flash memory), or any other volatile solid state memory.

As a control center of the electronic device, the processor 310 may be connected to the other members of the electronic device via various interfaces and circuits, and configured to run or execute the software program and/or module stored in the memory 309, and call out the data stored in the memory 309, so as to execute the functions of the electronic device and process the data, thereby to monitor the entire electronic device. The processor 310 may include one or more processing units. In a possible embodiment of the present disclosure, an application processor and a modem may be integrated into the processor 310. The application processor is mainly configured to process the operating system, a user interface and the application. The modem is mainly configured to process wireless communication. It should be appreciated that, the modem may also not be integrated into the processor 310.

The power source 311 (e.g., a battery) is configured to supply power to the members of the mobile terminal 300. In a possible embodiment of the present disclosure, the power source 311 is logically connected to the processor 310 via a power source management system, so as to achieve such functions as charging, discharging and power consumption management through the power source management system.

In addition, the mobile terminal 300 may include some functional modules not shown in FIG. 3, which will not be particularly defined herein.

The present disclosure further provides in some embodiments a mobile terminal, which includes a processor 310, a memory 309, and a computer program stored in the memory 309 and executed by the processor 310. The computer program is executed by the processor 310 so as to implement the above-mentioned multi-piece text copy method with a same technical effect, which will not be particularly defined herein.

The present disclosure further provides in some embodiments a computer-readable storage medium storing therein a computer program. The computer program is executed by a processor so as to implement the above-mentioned multi-piece text copy method with a same technical effect, which will not be particularly defined herein. The computer-readable storage medium may be a Read-Only Memory (ROM), a Random Access Memory (RAM), a magnetic disk or an optical disk.

It should be further appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A multi-piece text copy method, comprising:
receiving N inputs from a user;
displaying N text editing controls in response to the N inputs respectively comprising displaying one text editing control in response to receiving each input of the N inputs from the user, wherein each text editing control comprises a text selection identifier and a control addition identifier, N is an integer greater than 1, and any two of N pieces of target text are not adjacent to each other;
determining and adjusting a text selection area in response to dragging the text selection identifier of any one of the N displayed text editing controls;
receiving a slide operation with the control addition identifier of any one of the N displayed text editing controls as a starting point;
adding and displaying one text editing control at a position where a slide end point of the slide operation is located in response to receiving the slide operation;
acquiring the N pieces of target text selected by the N text editing controls respectively;
after acquiring the N pieces of target text, receiving a first input from the user at a target position in first text information; and
copying the N pieces of target text to the target position in response to the first input.

2. The multi-piece text copy method according to claim 1, wherein the receiving the N inputs from the user comprises: receiving an input from the user in second text information, and
wherein the displaying the N text editing controls respectively in response to the N inputs comprises: displaying a first text editing control at an input position of the input in the second text information in response to the input in the second text information.

3. The multi-piece text copy method according to claim 2, wherein subsequent to receiving the input from the user in the second text information, the multi-piece text copy method further comprises: receiving an $N^{th}$ input from the user on a first target text editing control of N−1 text editing controls, and
wherein the displaying the N text editing controls in response to the N inputs respectively comprises: displaying the $N^{th}$ text editing control at an input end position of the $N^{th}$ input in response to the $N^{th}$ input.

4. The multi-piece text copy method according to claim 3, wherein the $N^{th}$ input is a slide operation with a first control addition identifier of the first target text editing control as a slide start position, and wherein the displaying the $N^{th}$ text editing control at an input end position of the $N^{th}$ input in response to the $N^{th}$ input comprises: displaying the $N^{th}$ text editing control at a slide end position of the slide operation in response to the $N^{th}$ input.

5. The multi-piece text copy method according to claim 1, wherein each text editing control further comprises a symbol selection identifier, and wherein subsequent to displaying the N text editing controls in response to the N inputs respectively, the multi-piece text copy method further comprises:

receiving a dragging input from the user on a symbol selection identifier of a target text editing control;

controlling the symbol selection identifier of the target text editing control to move in response to the dragging input;

acquiring a dragging end position of the dragging input;

receiving a second input from the user on the symbol selection identifier of the target text editing control; and adding a target symbol selected by the second input to the dragging end position.

6. The multi-piece text copy method according to claim 5, further comprising:

when the symbol selection identifier of the target text editing control is dragged by the user, displaying a preset cursor at a preset side of the symbol selection identifier, wherein the preset cursor is capable of moving following the symbol selection identifier, and the acquiring the dragging end position of the dragging input comprises:

determining a movement end position of the preset cursor as the dragging end position.

7. The multi-piece text copy method according to claim 1, wherein subsequent to displaying the N text editing controls in response to the N inputs respectively, the multi-piece text copy method further comprises:

receiving a second input from the user on a control addition identifier of a target text editing control of the N text editing controls; and deleting the target text editing control in response to the second input, and cancelling a target text selected by the target text editing control.

8. The multi-piece text copy method according to claim 7, wherein the second input is a dragging operation performed by the user on the control addition identifier of the target text editing control, and wherein the deleting the target text editing control in response to the second input and cancelling the target text selected by the target text editing control comprises: in a case that a dragging speed of the dragging operation is greater than a preset threshold and a dragging end position is within a preset area, deleting the target text editing control, and cancelling the target text selected by the target text editing control.

9. The multi-piece text copy method according to claim 7, wherein the target text editing control comprises a first control addition identifier and a second control addition identifier, and wherein the second input is a dragging operation performed by the user on the first control addition identifier, and wherein the deleting the target text editing control in response to the second input and cancelling the target text selected by the target text editing control comprises:

controlling the first control addition identifier to move in response to the second input; and in a case that a movement end position of the first control addition identifier overlaps the second control addition identifier, deleting the target text editing control and cancelling the target text selected by the target text editing control.

10. The multi-piece text copy method according to claim 1, wherein subsequent to displaying the N text editing controls in response to the N inputs respectively, the multi-piece text copy method further comprises:

receiving a dragging input from the user on a first text editing control;

controlling the first text editing control to move in response to the dragging input; and in a case that a movement end position of the first text editing control overlaps a second text editing control, merging consecutive pieces of text between a first character in a first target text selected by the first text editing control and a last character in a second target text selected by the second text editing control into a piece of target text.

11. The multi-piece text copy method according to claim 1, wherein subsequent to displaying the N text editing controls in response to the N inputs respectively, the multi-piece text copy method further comprises:

receiving a second input from the user on the N text editing controls;

sorting the N pieces of target text selected by the N text editing controls respectively in response to the second input; and displaying the sorted N pieces of target text.

12. The multi-piece text copy method according to claim 11, wherein the second input comprises click operations performed by the user on the N text editing controls, and wherein the sorting the N pieces of target text selected by the N text editing controls respectively in response to the second input comprises:

acquiring a click order of the click operations; and adjusting an order of the N pieces of target text selected by the N text editing controls respectively based on the click order.

13. The multi-piece text copy method according to claim 11, wherein the second input is a dragging operation performed by the user on the N text editing controls, and wherein the sorting the N pieces of target text selected by the N text editing controls respectively in response to the second input comprises: controlling the N pieces of target text selected by the N text editing controls respectively to move in response to the dragging operation.

14. The multi-piece text copy method according to claim 1, wherein the first input is an input of a target trajectory performed by the user at the target position in the first text information, and wherein the copying the N pieces of target text to the target position in response to the first input comprises:

acquiring a target characteristic point of the target trajectory; and copying the N pieces of target text to the target position in the first text information indicated by the target characteristic point.

15. The multi-piece text copy method according to claim 1,
wherein the first input is a press input performed by the user at the target position in the first text information, and
wherein the copying the N pieces of target text to the target position in response to the first input comprises:
displaying a preset cursor at the target position in response to the press input; and
copying the N pieces of target text to a position of the preset cursor.

16. The multi-piece text copy method according to claim 1, wherein subsequent to receiving the input from the user at the target position in the first text information, the multi-piece text copy method further comprises:
displaying a preset virtual keyboard at the target position in response to the input;
receiving a character input from the user through the virtual keyboard; and
adding a character inputted by the user to the target position in response to the character input.

17. A mobile terminal, comprising a memory, a processor, and a computer program stored in the memory and executed by the processor, wherein the processor is configured to execute the computer program to implement a multi-piece text copy method, wherein the multi-piece text copy method comprises:
receiving N inputs from a user;
displaying N text editing controls in response to the N inputs respectively comprising displaying one text editing control in response to receiving each input of the N inputs from the user, wherein each text editing control comprises a text selection identifier and a control addition identifier, N is an integer greater than 1, and any two of N pieces of target text are not adjacent to each other;
determining and adjusting a text selection area in response to dragging the text selection identifier of any one of the N displayed text editing controls;
receiving a slide operation with the control addition identifier of any one of the N displayed text editing controls as a starting point;
adding and displaying one text editing control at a position where a slide end point of the slide operation is located in response to receiving the slide operation;
acquiring the N pieces of target text selected by the N text editing controls respectively;
after acquiring the N pieces of target text, receiving a input from the user at a target position in first text information; and
copying the N pieces of target text to the target position in response to the first input.

18. The mobile terminal according to claim 17,
wherein the receiving the N inputs from the user comprises: receiving an input from the user in second text information, and
wherein the displaying the N text editing controls respectively in response to the N inputs comprises: displaying a first text editing control at an input position of the input in the second text information in response to the input in the second text information.

19. The mobile terminal according to claim 18,
wherein subsequent to receiving the input from the user in the second text information, the processor is further configured to execute the computer program so as to receive an $N^{th}$ input from the user on a first target text editing control of N−1 text editing controls, and
wherein the displaying the N text editing controls in response to the N inputs respectively comprises: displaying the $N^{th}$ text editing control at an input end position of the $N^{th}$ input in response to the $N^{th}$ input.

20. A non-transitory computer-readable storage medium storing therein a computer program, wherein the computer program is executed by a processor so as to implement the multi-piece text copy method according to claim 1.

* * * * *